United States Patent [19]
Sternbergh

[11] Patent Number: 5,694,240
[45] Date of Patent: Dec. 2, 1997

[54] MULTILAYER ANTI-REFLECTIVE AND ULTRAVIOLET BLOCKING COATING FOR SUNGLASSES

[75] Inventor: James H. Sternbergh, Webster, N.Y.

[73] Assignee: Bausch & Lomb Incorporated, Rochester, N.Y.

[21] Appl. No.: 470,731

[22] Filed: Jun. 6, 1995

Related U.S. Application Data

[63] Continuation-in-part of Ser. No. 265,183, Jun. 24, 1994, abandoned.

[51] Int. Cl.$^6$ .............................. G02B 5/28; G02B 7/10; G02B 5/22; G02C 7/10
[52] U.S. Cl. ...................... 359/359; 359/361; 359/581; 359/589; 359/590; 351/163
[58] Field of Search .................... 359/359, 361, 359/581, 580, 586, 588, 589, 590, 888, 355; 351/163

[56] References Cited

U.S. PATENT DOCUMENTS 4,802,755  2/1989  Hensler ............................. 351/163
5,147,125  9/1992  Austin .............................. 359/359

OTHER PUBLICATIONS

A. Thelen, Design of Optical Interference Coatings (McGraw–Hill, NY, 1989), pp. 103–107.

H. A. Macleod, "A new approach to the design of metal–dielectric thin–film optical coatings", Optica Acta, vol. 24, No. 2 (1978), pp. 93–106.

P. H. Berning et al., "Induced Transmission in Absorbing Films Applied to Band Pass Filter Design", J. Opt. Soc. Amer., vol. 47, No. 3 (1957), pp. 230–239.

*Primary Examiner*—Jon W. Henry
*Attorney, Agent, or Firm*—Chris P. Konkol; Denis A. Polyn

[57] ABSTRACT

A sunglass has a multilayer coating on its concave (rear) surface that comprises a absorbing layer and at least one composite layer for reducing transmittance of UV radiation. Reflection of visible light at the concave surface is minimized.

31 Claims, 2 Drawing Sheets

MULTILAYER ANTI-REFLECTIVE AND ULTRAVIOLET BLOCKING COATING FOR SUNGLASSES

This application is a continuation in part of U.S. application No. Ser. 08/265,183, filed on Jun. 24, 1994, now abandoned.

BACKGROUND OF THE INVENTION

The present invention relates to a multilayer coating for sunglasses that provides anti-reflection, blocking of ultraviolet radiation, and controlled transmittance.

For sunglasses intended to provide ultraviolet protection, it is important that the lenses block a wide range of ultraviolet (UV) radiation, including UV radiation with wavelengths below 380 nm. In fact, recent concern on the effects of UV radiation to the eye has indicated a desire that sunglasses effectively block radiation with wavelengths lower than 400 nm.

It is important also that sunglass lenses provide the desired UV blocking while maintaining sufficient transmittance of light in the visible region. Additionally, it may be desirable that the lenses provide a selective spectral transmittance within the visible region, i.e., the lenses have higher transmittance at certain wavelengths and lower transmittance at other wavelengths to enhance contrast.

UV blocking can be provided by selecting a substrate made of a material that has the capability to absorb UV radiation. However, the choice of UV-blocking substrates is limited if it is desired to employ a substrate having a selective spectral transmittance within the visible region.

A further consideration is that reflection of visible light at the concave (or rear) lens surface should be sufficiently low to minimize glare from incident light at this surface.

The challenge is to develop sunglass lenses having the combination of desired transmittance in the visible region, UV blocking and anti-reflection, and sunglass lens coatings that can be used with a wide variety of substrate materials.

SUMMARY OF THE INVENTION

In a first embodiment, the present invention relates to a sunglass lens comprising a substrate in the shape of a lens and a multilayer coating formed on the concave (rear) surface of the lens substrate. The multilayer coating comprises an absorbing layer disposed adjacent to the substrate which reduces transmittance of light therethrough by at least 10%. The absorbing layer comprises $TiO_x$ wherein x is about 0.2 to 1.5. The multilayer coating further includes a composite layer comprising at least two layers and disposed adjacent to the absorbing layer, the composite layer reducing transmittance of radiation having wavelengths shorter than about 380 nm therethrough to about 1% or lower. Reflection of visible light at an interface of the coating with air is no greater than about 2%.

According to a second embodiment, the invention relates to a method of providing a coated sunglass lens with a desired transmittance of light. The method comprises: forming an absorbing layer on the concave surface of the lens-shaped substrate, the absorbing layer comprising $TiO_x$ wherein x is about 0.2 to 1.5, and selecting a thickness of the absorbing layer that provides the desired transmittance of light therethrough; forming a composite layer on the absorbing layer, the composite layer comprising at least two layers and reducing transmittance of radiation having wavelengths shorter than about 380 nm therethrough to about 1% or lower; and selecting the absorbing layer and the composite layer so that reflection of visible light at an interface of the coating with air is no greater than about 2%.

In another embodiment, the present invention relates to a sunglass lens comprising a substrate in the shape of a lens and a multilayer coating formed on the concave surface of the lens substrate wherein the position of the absorbing layer and composite layer are reversed and an anti-reflective layer is disposed adjacent to and on top of the absorbing layer.

DETAILED DESCRIPTION OF PREFERRED EMBODIMENTS

Figure 1:
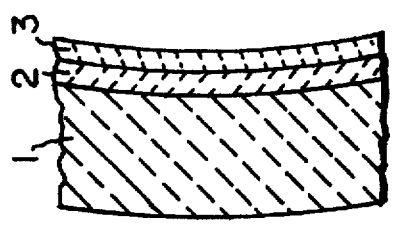
FIG. 1 is an enlarged partial sectional view of an embodiment of the invention.

FIG. 1 illustrates an embodiment of the invention. The substrate 1 on which the coating is applied has the form of a lens. The substrate material may be glass or plastic. Absorbing layer 2 is disposed adjacent to the substrate 1 on the concave surface. Composite layer 3 comprises at least two layers and is disposed adjacent to absorbing layer 2.

Absorbing layer 2 comprises $TiO_x$ wherein x is about 0.2 to 1.5. A primary purpose of the absorbing layer is to reduce transmittance of light including light in the visible region of 450 to 700 nm. Preferably, the absorbing layer is selected so that it reduces transmittance of light therethrough by at least 10%, more preferably at least 20%. Generally, the thickness of the absorbing layer will be about 20 to 40 nm. An advantage of the absorbing layer is that it provides a relatively neutral density, i.e., a desired transmittance can be provided by selecting the thickness of the absorbing layer, and varying the thickness of the layer imparts no or minimal visible change to the substrate material other than darkening or lightening. In other words, the absorbing layer does not significantly change the spectral transmittance of the substrate in the visible region.

The absorbing layer preferably has an extinction coefficient (k) ranging from about 0.2 to 2.4, to ensure adequate absorption. For comparison, a layer formed of $TiO_2$ has an extinction coefficient that is near zero at all visible wavelengths. Additionally, the absorbing layer preferably has a refractive index (n) ranging from about 0.1 to 3 preferably ranging from about 1.5 to 2.5, more preferably ranging from about 1.6 to 2.0. Again, for comparison, a layer of $TiO_2$ has a dispersive refractive index which is larger at short wavelengths.

The absorbing layer may be deposited directly on the substrate by methods generally known in the art, such as physical vapor deposition or chemical vapor deposition. Both oxygen and nitrogen are included in the reaction chamber to obtain a layer formed primarily of $TiO_x$, although the process may result in formation of other materials, such as titanium nitrides. By varying the pressures of the oxygen and nitrogen, the composition of the absorption layer can be optimized to obtain a layer having the desired optical properties.

It is further preferred that the coated lens has a luminous transmittance of about 8% to 40% (as determined by the American National Standard Institute, Inc., ANSI Z80.3-1986, incorporated herein by reference) and meets the ANSI Z80.3-1986 properties for recognition of red, green and yellow traffic signal colors so that the lenses are suitable for wear during driving.

Composite layer 3 is disposed adjacent to absorbing layer 2. Composite layer 3 comprises at least two layers wherein the lowermost layer is in contact with the absorbing layer or the substrate 1, and the uppermost layer will generally have an interface with air, i.e., generally, the multilayer coating will not include any layers other than absorbing layer 2 and the layers forming composite layer 3 as shown in the embodiment of FIG. 1.

Figure 2:
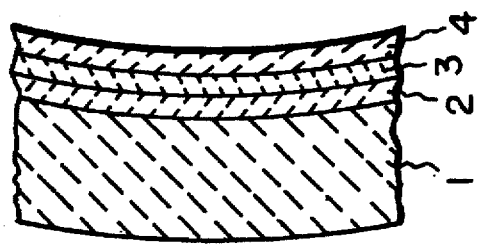
FIG. 2 is an enlarged partial sectional view of another embodiment of the invention.

FIG. 2 illustrates a preferred embodiment of the invention. Substrate 1 is the same as in FIG. 1. The composition and properties of both the absorbing layer and composite layer in both FIG. 1 and FIG. 2 are the same; however, in FIG. 2 the position of the absorbing layer and composite layer are reversed. In FIG. 2, composite layer 5 comprises at least two layers and is disposed adjacent to the substrate 1 on the concave surface. Absorbing layer 6 is disposed adjacent to and on top of composite layer 2. Anti-reflective layer 4 is disposed adjacent to and on top of absorbing layer 6. While FIG. 1 and FIG. 2 illustrate two different arrangement of layers, there is no significant difference in the spectrum of transmitted light when the relative positions of the composite layer and absorbing layer are reversed.

Anti-refletive layer 4 comprises a single low index layer having a refractive index essentially anti-reflecting this layer to air. A primary purpose of this layer is to reduce visible reflection. Generally, the thickness of the anti-reflective layer will be about 60 to 120 nm. An advantage of the anti-reflective layer is that it provides low visible light reflection in combination with the underlying layers. Anti-reflective layer 4 has a refractive index in the visible light range between 1.30 and 1.75, and examples of suitable materials include silicon dioxide, aluminum oxide, magnesium fluoride and other low index oxides and fluorides. The anti-reflective layer can be deposited in the same manner as the composite layer, and can also be deposited by other well known deposition techniques. More than one anti-reflective layer may be used for applications which require different levels of anti-reflection.

The absorbing layer may reduce transmittance of UV radiation to some degree, since this layer will absorb some radiation in the UV region. However, a primary purpose of the composite layer is to ensure effective UV blocking by reducing transmittance of all radiation having wavelengths shorter than about 380 nm therethrough to about 1% or lower, and more preferably about 0.5% or lower. Coated sunglass lenses having an average transmittance near zero over the range 320 to 380 nm, and even the range 320 to 400 nm, are obtainable by the present invention.

Many multilayer composites are generally known for reducing transmittance of UV radiation. A preferred composite layer for use in the coating of this invention comprises a stack of alternating layers of materials with high and low refractive indices (preferably, at least 9 alternating layers for this embodiment). As used herein, "high refractive index" denotes a refractive index of about 2.00 to 2.50, and "low refractive index" denotes a refractive index of about 1.37 to 1.52, and such materials are generally known in the art. As an example, the composite layer may be comprised of a stack of alternating layers composed of titanium dioxide ($TiO_2$) and silicon dioxide ($SiO_2$). The thickness of the individual layers is generally about 20 to 100 nm, and the individual layers of the composite layer may be deposited by methods known in the art, such as physical vapor deposition or chemical vapor deposition.

The absorbing layer and the composite layer are further selected such that reflection of visible light at an interface of the coating with air is sufficiently low to minimize glare. According to the invention, reflection of visible light at the interface is no greater than about 2%, more preferably no greater than about 1%.

Glare at the concave (rear) lens surface results from reflection of incident light at the concave surface. For an uncoated lens, a portion of incident light at the concave lens surface would be reflected from the concave surface of the lens substrate towards the wearer's eye, and additionally, a portion of the non-reflected light passing through the substrate would be reflected from the convex surface of the lens substrate towards the wearer's eye.

In the present invention, reflectance at the concave lens surface is reduced since the multilayer coating thereon can be designed to provide antireflection. Additionally, the absorbing layer serves to further reduce reflected light. Any non-reflected light at this surface must pass through the absorbing layer twice, once upon entering the coating, and again after passing through the substrate and being reflected from the convex surface. It will be appreciated that each pass through the absorbing layer reduces transmittance of light therethrough.

For the described preferred embodiment wherein the composite layer comprises a stack of alternating layers of materials with high and low refractive indices adjacent to the absorbing layer, standard computer models can be used to determine optimum film thickness and refractive indices to effect anti-reflection and UV blocking, as would be evident to one skilled in the art.

Additional preferred embodiments are illustrated in the following examples.

EXAMPLES 1 AND 2

Representative coatings providing the desired transmittance, UV-blocking and anti-reflection are shown in Tables 1 and 2. In these tables, layer A corresponds to absorbing layer 2 of FIG. 1, and layers B-1, B-2, etc., collectively correspond to composite layer 3. Each coating is designed for a substrate having a refractive index (n) of about 1.52 and at a design wavelength of 550 nm.

TABLE 1

| Layer | Materia | Optical Thickness |
|---|---|---|
| A | $TiO_x$ | 0.15 |
| B-1 | $TiO_2$ | 0.219 |
| B-2 | $SiO_2$ | 0.085 |
| B-3 | $TiO_2$ | 0.141 |
| B-4 | $SiO_2$ | 0.195 |
| B-5 | $TiO_2$ | 0.0964 |
| B-6 | $SiO_2$ | 0.193 |
| B-7 | $TiO_2$ | 0.153 |
| B-8 | $SiO_2$ | 0.14 |
| B-9 | $TiO_2$ | 0.158 |
| B-10 | $SiO_2$ | 0.172 |
| B-11 | $TiO_2$ | 0.145 |
| B-12 | $SiO_2$ | 0.129 |
| B-13 | $TiO_2$ | 0.156 |
| B-14 | $SiO_2$ | 0.31 |
| air | | |

TABLE 2

| Layer | Material | Optical Thickness |
| --- | --- | --- |
| A | $TiO_x$ | 0.12 |
| B-1 | $TiO_2$ | 0.151 |
| B-2 | $SiO_2$ | 0.117 |
| B-3 | $TiO_2$ | 0.133 |
| B-4 | $SiO_2$ | 0.16 |
| B-5 | $TiO_2$ | 0.146 |
| B-6 | $SiO_2$ | 0.153 |
| B-7 | $TiO_2$ | 0.161 |
| B-8 | $SiO_2$ | 0.144 |
| B-9 | $TiO_2$ | 0.15 |
| B-10 | $SiO_2$ | 0.174 |
| B-11 | $TiO_2$ | 0.134 |
| B-12 | $SiO_2$ | 0.145 |
| B-13 | $TiO_2$ | 0.133 |
| B-14 | $SiO_2$ | 0.317 |
| air | | |

EXAMPLE 3

Representative coatings providing the desired transmittance, UV-blocking and anti-reflection are shown in Table 6. In this table layers C-1, C-2, C-3, etc., collectively correspond to composite layer 3 of FIG. 2, layer D corresponds to absorbing layer 6 and layer E corresponds to anti-reflective layer 4. Each coating is designed for a substrate having a refractive index (n) of about 1.52 and at a design wavelength of 550 nm.

TABLE 3

| Layer | Materia | Optical Thickness |
| --- | --- | --- |
| C-1 | $SiO_2$ | .07 |
| C-2 | $TiO_2$ | .09 |
| C-3 | $SiO_2$ | .157 |
| C-4 | $TiO_2$ | .152 |
| C-5 | $SiO_2$ | .149 |
| C-6 | $TiO_2$ | .158 |
| C-7 | $SiO_2$ | .165 |
| C-8 | $TiO_2$ | .164 |
| C-9 | $SiO_2$ | .143 |
| C-10 | $TiO_2$ | .168 |
| C-11 | $SiO_2$ | .176 |
| C-12 | $TiO_2$ | .149 |
| C-13 | $SiO_2$ | .134 |
| C-14 | $TiO_2$ | .199 |
| C-15 | $SiO_2$ | .146 |
| D | $TiO_x$ | .15 |
| E | $SiO_2$ | .273 |

Figure 3:
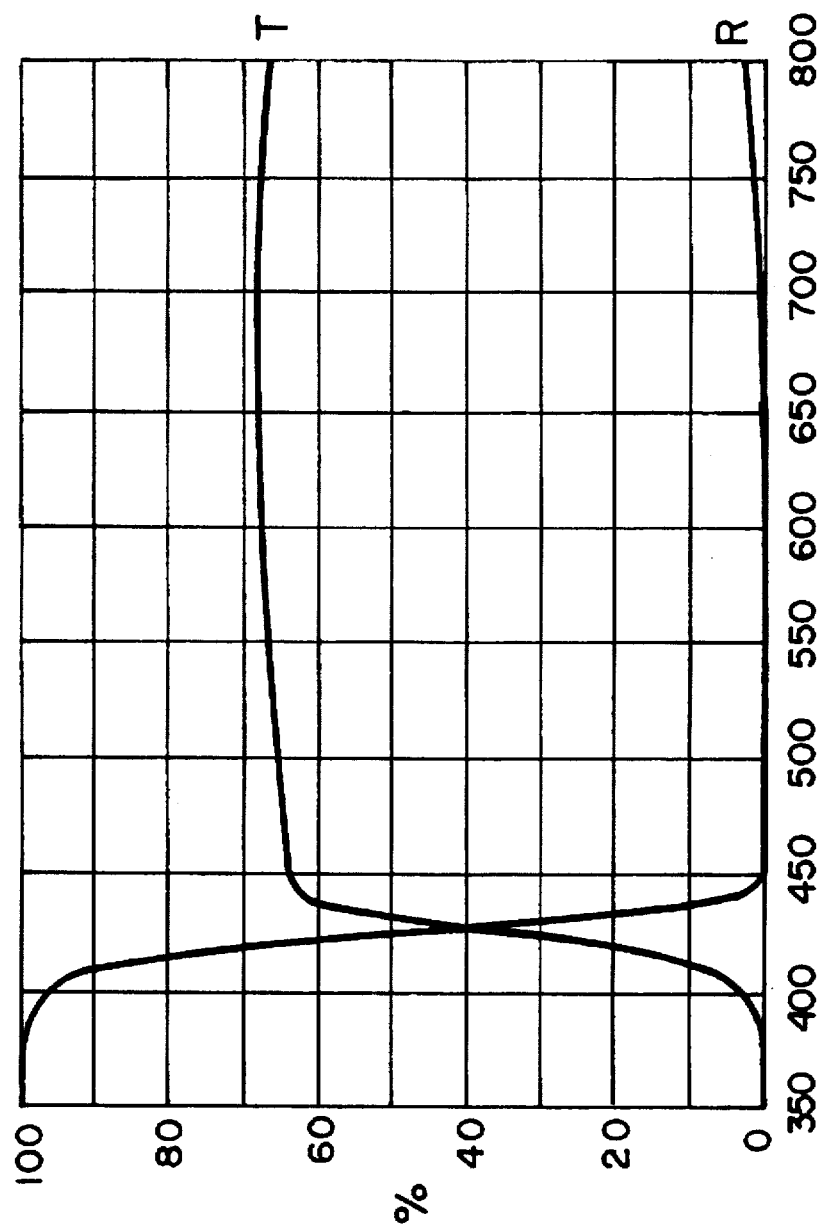
FIG. 3 illustrates transmittance and reflectance provided by a coating according to an embodiment of the invention.

The theoretical transmittance and reflectance of the coating in Table 1 are plotted in FIG. 3, wherein the x-axis represents wavelength (nm), Line T represents transmittance and Line R represents reflectance.

Since the present invention provides effective anti-reflection and does not require that the substrate material provides UV blocking, a wide range of materials may be used for the substrate (including colored, transparent substrate materials). For example, there are available glasses or plastics including photochromic glasses) that exhibit unique or desirable spectral transmittance in the visible region but otherwise are too highly reflective and/or too highly transmisive of UV radiation for sunglass applications. Representative substrate materials having such desired spectral transmittance for sunglass applications include glasses available under the trade names BG 20 and BG 36 (Schott Glaswerke). The coatings of the invention render such materials suitable for sunglass applications while maintaining the desired spectral transmittance.

Figure 4:
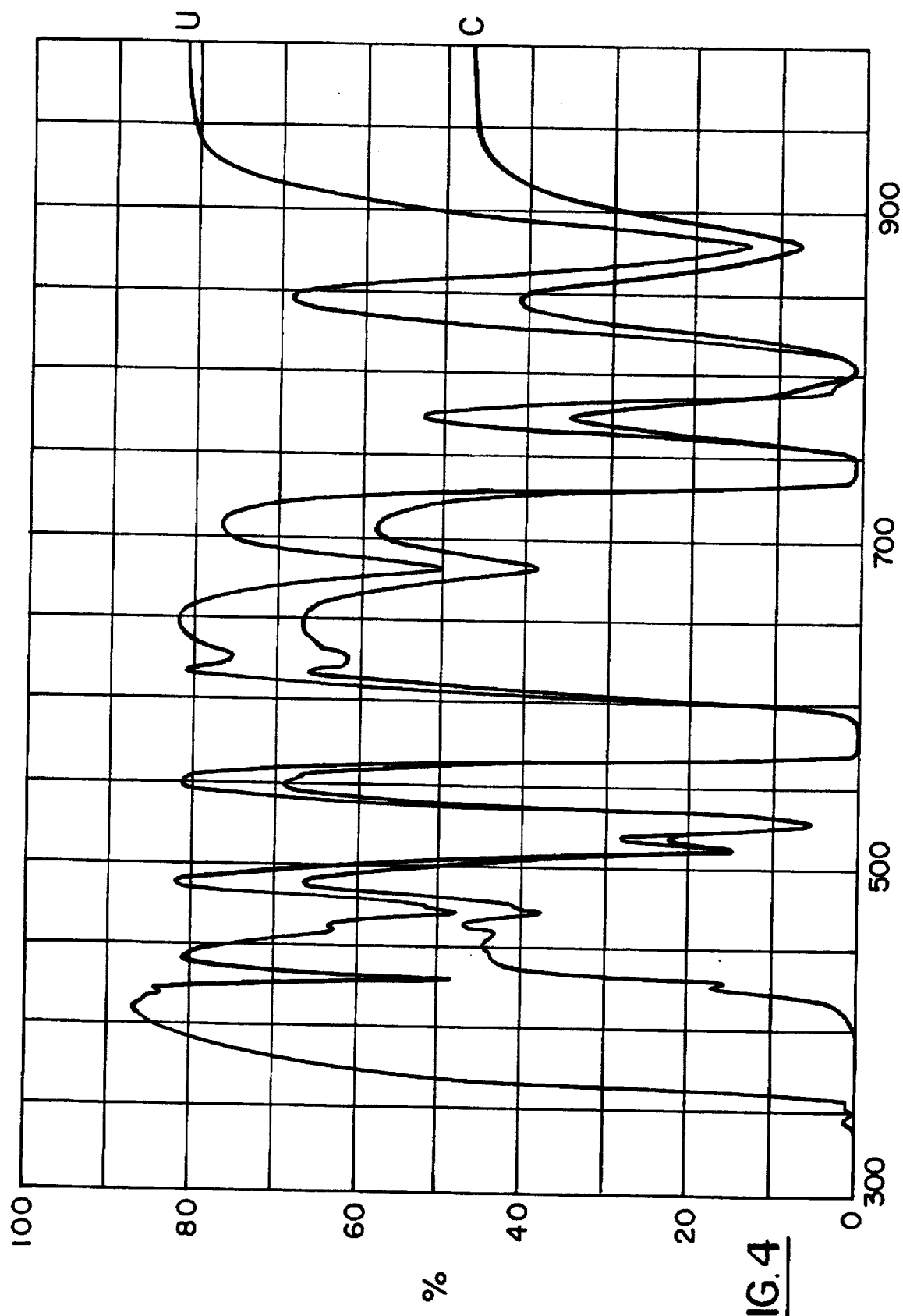
FIG. 4 illustrates transmittance of a sunglass lens according to an embodiment of the invention.

FIG. 4 illustrates the transmittance of an uncoated glass substrate, versus the glass substrate coated with a coating of the present invention, wherein the x-axis represents wavelength (nm), Line U represents the transmittance of the uncoated glass substrate, and Line C represents the transmittance of the coated substrate. In the visible region, the coating effectively reduced transmittance to a desired level, but otherwise contributed only minimal changes to the spectral transmittance of the substrate in the visible region. In the UV region, the uncoated substrate material had a relatively high transmittance in the UV range, but the coating effectively blocked transmittance of UV radiation (including radiation having wavelengths lower than 400 nm). Reflectance at the interface of the coating (not shown in FIG. 3) was reduced to less than 1% over the visible region.

Additionally, it will be appreciated that no coatings are required on the convex (front) surface of the lens substrate, affording reduced costs in manufacturing. Also, if desired, optional coatings can easily be formed on the convex surface, such as a hard top coating or a scratch-resistant coating.

Although certain preferred embodiments have been described, it is understood that the invention is not limited thereto and modifications and variations would be evident to a person of ordinary skill in the art.

I claim:

1. A sunglass lens comprising a substrate in the shape of a lens and a multilayer coating formed on a concave surface of the substrate, which coating provides anti-reflection, blocking of UV radiation and controlled transmission of visible light, the coating comprising, in order of proximity to the concave surface, the following layers:

(a) an absorbing layer disposed on the concave surface of the substrate and comprising $TiO_x$ wherein x is about 0.2 to 1.5, which absorbing layer reduces the transmittance of visible light therethrough by at least 10%; and (b) a composite layer disposed adjacent to the absorbing layer and comprising a stack of alternating layers of high and low refractive indices as a means for reducing the transmittance of radiation having wavelengths shorter than about 400 nm therethrough to about 1% or lower;

wherein the stack of alternating layers and the absorbing layer also reduces the reflection of visible light at an interface of said coating with air to no greater than about 2%.

2. The sunglass lens of claim 1, wherein the multilayer coating consists of the stack of alternating layers and the absorbing layer.

3. The sunglass lens of claim 2, wherein said stack is composed of alternating layers of titanium dioxide and silicon dioxide.

4. The sunglass lens of claim 1, having no coating on a surface of the lens.

5. The sunglass lens of claim 1, wherein the lens is formed of glass.

6. The sunglass lens of claim 1, wherein the lens is formed of plastic.

7. The sunglass lens of claim 1, wherein the absorbing layer has a refractive index (n) ranging from about 1.5 to 2.5.

8. The sunglass lens of claim 1, wherein the absorbing layer has an extinction coefficient (k) in the visible light region ranging from about 0.2 to 2.4.

9. The sunglass lens of claim 1, wherein said composite layer reduces transmittance of radiation having wavelengths shorter than about 400 nm therethrough to about 0.5% or lower.

10. The sunglass lens of claim 1, wherein reflection of visible light at an interface of said coating with air is no greater than about 1%.

11. The sunglass lens of claim 1, wherein the sunglass lens has a luminous transmittance of 8 to 40%, and an average transmittance near zero over the range 320 to 380 nm.

12. A lens comprising a substrate in the shape of a lens and a multilayer coating formed on a concave surface of the substrate, which coating provides anti-reflection, blocking of UV radiation and controlled transmission of visible light, the coating comprising, in order of proximity to the concave surface, the following layers:

(a) an absorbing layer disposed on the concave surface of the substrate, said absorbing layer composed of a material having a refractive index ranging from about 0.1 to 3.0 and an extinction coefficient (k) from about 0.2 to 2.4, said absorbing layer reducing the transmittance of visible light therethrough by at least 10%; and (b) a composite layer disposed adjacent to the absorbing layer and comprising a stack of alternating layers of high and low refractive indices as a means for reducing the transmittance of radiation having wavelengths shorter than about 400 nm therethrough to about 1% or lower;

wherein the stack pf alternating layers and the absorbing layer also reduces the reflection of visible light at an interface of said coating with air to no greater than about 2%.

13. A method of providing a lens with a multilayer coating for anti-reflection, blocking of UV radiation and controlled transmission of visible light, the method comprising, in order, the following steps:

(a) forming an absorbing layer on a concave surface of a substrate layer of said lens, said absorbing layer comprising of $TiO_x$ wherein x is about 0.2 to 1.5, and selecting a thickness of said absorbing layer that provides the desired transmittance of visible light therethrough;

(b) forming a composite layer on the absorbing layer, said composite layer comprising a stack of alternating layers of high and low refractive indices as a means for reducing transmittance of radiation having wavelengths shorter than about 400 nm therethrough to about 1% or lower;

and selecting said absorbing layer and stack of alternating layers so that reflection of visible light at an interface of said coating with air is no greater than about 2%.

14. A sunglass lens comprising a substrate in the shape of a lens and a multilayer coating formed on a concave surface of the substrate, which coating provides anti-reflection, blocking of UV radiation and controlled transmission of visible light, the coating comprising, in order of proximity to the concave surface, the following layers:

(a) a composite layer disposed on said concave surface and comprising a stack of alternating layers of high and low refractive indices as a means for reducing the transmittance of radiation having wavelengths shorter than about 400 nm therethrough to about 1% or lower;

(b) an absorbing layer disposed adjacent to the composite layer, said absorbing layer comprising $TiO_x$ wherein x is about 0.2 to 1.5, and reducing transmittance of visible light therethrough by at least 10%; and (c) an anti-reflective layer disposed adjacent to and on top of the absorbing layer;

wherein the anti-reflective layer in combination with the stack of alternating layers and the absorbing layer provide a means for reducing the reflection of visible light at an interface of said coating with air to no greater than about 2%.

15. The sunglass lens of claim 14, wherein the multilayer coating consists of the stack of alternating layers, the absorbing layer and the anti-reflective layer.

16. The sunglass lens of claim 15, wherein said stack is composed of alternating layers of titanium dioxide and silicon dioxide.

17. The sunglass lens of claim 14, having no coating on a convex surface of the lens.

18. The sunglass lens of claim 14, wherein the lens is formed of glass.

19. The sunglass lens of claim 14, wherein the lens is formed of plastic.

20. The sunglass lens of claim 14, wherein the absorbing layer has a refractive index (n) ranging from about 1.5 to 2.5.

21. The sunglass lens of claim 14, wherein the absorbing layer has an extinction coefficient (k) ranging from about 0.2 to 2.4.

22. The sunglass lens of claim 14, wherein said composite layer reduces transmittance of radiation having wavelengths shorter than about 380 nm therethrough to about 0.5% or lower.

23. The sunglass lens of claim 14, wherein reflection of visible light at an interface of said coating with air is no greater than about 1%.

24. The sunglass lens of claim 14, wherein the sunglass lens has a luminous transmittance of 8 to 40, and an average transmittance near zero over the range 320 to 380 nm.

25. The sunglass lens of claim 14, wherein the anti-reflective layer comprises a low index film of about 60 to about 120 nm thickness.

26. The sunglass lens of claim 14, wherein the anti-reflective layer comprises a low index film of about 100 nm thickness.

27. The sunglass lens of claim 14, wherein the anti-reflective layer is selected from the group consisting essentially of low index oxides and low index fluorides.

28. The sunglass lens of claim 14, wherein the anti-reflective layer is silicon dioxide.

29. The sunglass lens of claim 14, wherein the anti-reflective layer is deposited in two or more layers.

30. A lens comprising a substrate in the shape of a lens and a multilayer coating formed on a concave surface of the substrate, which coating provides anti-reflection, blocking of UV radiation and controlled transmission of visible light, the coating comprising, in order of proximity to the concave surface, the following layers:

(a) a composite layer disposed on the concave surface of the substrate, said composite layer comprising a stack of alternating layers of high and low refractive indices as the means for reducing the transmittance of radiation having wavelengths shorter than about 400 nm therethrough to about 1% or lower;

(b) an absorbing layer disposed adjacent to the composite layer, said absorbing layer composed of a material having a refractive index (n) ranging from about 0.1 to 3.0 and an extinction coefficient (k) from about 0.9 to 7.0, said absorbing layer reducing transmittance of visible light therethrough by at least 10%; and (c) an anti-reflective layer disposed adjacent to and on top of the absorbing layer;

wherein said anti-reflective layer in combination with the absorbing layer and said composite layer provides a means for reducing the reflection of visible light at an interface of said coating with air to no greater than about 2%.

31. A method of providing a lens with a multilayer coating for anti-reflection, blocking of UV radiation and controlled transmission of visible light, the method comprising, in order, the following steps:

(a) forming a composite layer on a concave surface of a substrate layer of said lens, said composite layer comprising a stack of alternating layers of high and low refractive indicies as a means for reducing the transmittance of radiation having wavelengths shorter than about 400 nm therethrough to about 1% or lower;

(b) forming an absorbing layer on the composite layer, said absorbing layer comprising a $TiO_x$ wherein x is about 0.2 to 1.5, and selecting a thickness of said absorbing layer that provides the desired transmittance of visible light therethrough;

(c) forming an anti-reflective layer disposed adjacent to and on top of the absorbing layer;

wherein said absorbing layer, said composite layer and said anti-reflective layer is selected so that reflection of visible light at an interface of said coating with air is no greater than about 2%.

* * * * *